United States Patent
Inoue et al.

(10) Patent No.: US 8,001,294 B2
(45) Date of Patent: Aug. 16, 2011

(54) METHODS AND APPARATUS FOR PROVIDING A COMPRESSED NETWORK IN A MULTI-PROCESSING SYSTEM

(75) Inventors: Keisuke Inoue, Kanagawa (JP); Eiji Iwata, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 987 days.

(21) Appl. No.: 11/236,262

(22) Filed: Sep. 27, 2005

(65) Prior Publication Data

US 2006/0069879 A1 Mar. 30, 2006

Related U.S. Application Data

(60) Provisional application No. 60/613,901, filed on Sep. 28, 2004.

(51) Int. Cl.
*G06F 13/28* (2006.01)
*G06F 3/00* (2006.01)

(52) U.S. Cl. .................. 710/22; 710/2; 710/38

(58) Field of Classification Search .................. None
See application file for complete search history.

(56) References Cited

U.S. PATENT DOCUMENTS

| | | | |
|---|---|---|---|
| 6,526,491 B2 | 2/2003 | Suzuoki et al. | |
| 6,766,429 B1 | 7/2004 | Bland et al. | |
| 6,826,662 B2 | 11/2004 | Suzuoki et al. | |
| 2001/0034791 A1* | 10/2001 | Clubb et al. | 709/238 |
| 2002/0101367 A1 | 8/2002 | Geiger et al. | |
| 2002/0138637 A1 | 9/2002 | Suzuoki et al. | |
| 2003/0229719 A1 | 12/2003 | Iwata et al. | |
| 2003/0229765 A1 | 12/2003 | Suzuoki et al. | |
| 2005/0144388 A1* | 6/2005 | Newburn et al. | 711/118 |

FOREIGN PATENT DOCUMENTS

| | | |
|---|---|---|
| JP | 5-189360 | 7/1993 |
| JP | 10-027127 | 1/1998 |

OTHER PUBLICATIONS

Office Action from corresponding Japanese Application 2005-281647.
Chen, et al., "Reliability-Availability-Serviceability Characteristics of a Compressed-Memory System," IBM S390 Global Hardware Development Division, pp. 163-168, © 2000.
Corona Publishing Co., Ltd., "Technologies and Services on Digital Broadcasting (5) : Overview of MPEG-2 Systems," Broadcast Technology No. 11, pp. 16-23, Summer 2002.
D. Rand, "The PPP Compression Control Protocol (CCP)," Network Working Group, RFC 1962, pp. 1-9, Jun. 1996.
W. Simpson, editor, "The Point-to-Point Protocol (PPP)," Network Working Group, RFC 1661, pp. 1-47, Jul. 1994.
Lee, et al., "Real-Time MPEG Video Codec on a Single-Chip Multiprocessor," Proceedings of the SPIE, vol. 2187, pp. 32-42, Jun. 2, 1994.

* cited by examiner

*Primary Examiner* — Tariq Hafiz
*Assistant Examiner* — Scott Sun
(74) *Attorney, Agent, or Firm* — Lerner, David, Littenberg, Krumholz & Mentlik, LLP (57) ABSTRACT

The present invention provides methods and apparatus for transferring and storing data among processors and memory in a multiprocessor system. The data is compressed locally before it is sent to a shared memory. The memory stores the data in its compressed state, but the data is aligned in the memory in the same manner as uncompressed data would be. A tag table keeps track of the compression type and compressed data size for a set of data at a given address block. A data compressor and a data expander may be implemented in a direct memory access controller accessible to multiple coprocessors, or the compressor and the expander may be implemented within the coprocessors.

7 Claims, 7 Drawing Sheets

METHODS AND APPARATUS FOR PROVIDING A COMPRESSED NETWORK IN A MULTI-PROCESSING SYSTEM

CROSS-REFERENCE TO RELATED APPLICATION

This application claims the benefit of the filing date of U.S. Provisional Patent Application No. 60/613,901 filed Sep. 28, 2004, the entire disclosure of which is hereby incorporated by reference herein.

BACKGROUND

The present invention relates to data management, and, in particular, to methods and apparatus for compressing and decompressing data for transfer and storage in a multiprocessing environment.

Computing systems are becoming increasingly more advanced, often tying multiple processors (coprocessors) together in order to boost processing speed and enhance overall performance. Often, computing systems integrate the coprocessors in parallel (or at least in concert) to increase processing efficiency. Such advances are critical to the success of many applications, for example, real-time multimedia gaming and other computation-intensive applications.

A multiprocessing system may include numerous coprocessors interconnected by a shared data bus. The coprocessors may have access to a shared memory such as a dynamic random access memory (DRAM). The DRAM may be located locally or remotely from the coprocessors. For example, the DRAM may be on a different part of the computer chip or on a separate chip. Each coprocessor may frequently accesses the shared memory in order to store or process data for a particular task. Access by one processor may be independent of access by the other coprocessors.

Data is sent to the shared memory by means of a direct memory access controller (DMAC). The DMAC allows high-speed data transfer without tying up the resources of a processor. This is because the direct memory access (DMA) transfer rate is only limited by the memory read/write cycle time and the DMAC's speed.

Conventional operation of a DMAC is well known. A typical DMA data storage process is as follows. A processor requests a data transfer to a DMAC with a source address, destination address, and the amount of data to be transferred. The DMAC requests the data transfer to a target device that is associated with the source address. When the target is ready for the transfer, the DMAC transfers the data to or from the target device. Some systems are designed to be able to send an interrupt to the processor indicating completion of the DMA transfer. A bus protocol used with a DMA transfer may be as follows. Initially, a processor loads the DMAC with a starting address and the amount of data to be transferred. When the data is ready for transfer, the DMAC sends a DMA request to the processor. The processor then acknowledges the DMA request, floats the data bus, address bus and control lines, and suspends processing that uses the data and address buses. The DMAC then begins transferring the data to the storage device. Once the data transfer is complete, the DMAC terminates the DMA request and sends an interrupt to the processor indicating completion of the DMA transfer.

In the past, connectivity to the shared memory has presented a bottleneck in data flow, notwithstanding the use of a DMAC. For example, the coprocessors may be able to transfer data along the shared data bus among each other at a rate of 256 Gbits/sec. In contrast, the data transfer rate with the shared memory may only be at a rate of 204.8 Gbits/sec. Alternatively, even though the data transfer rates may be the same, the DMAC may not be able to transfer data between the shared memory and multiple coprocessors at the same time. Thus, it can be seen that the shared memory bottleneck can slow down processing and impede system performance.

Therefore, there is a need in the art for new methods and apparatus for achieving high data transfer rates between multiple processors and a shared memory.

SUMMARY OF THE INVENTION

In accordance with one embodiment of the present invention, an apparatus for processing data is provided. The apparatus comprises a plurality of processors operable to process the data, a data compressor operable to perform compression of the data, a data expander operable to perform decompression of the data, and a memory access unit configured to transfer the data compressed by the data compressor between a selected one of the processors and a shared memory, and to manage compression information associated with the data that is compressed.

In one alternative, the memory access unit includes the data expander and the data compressor. In another alternative, the selected processor includes the data expander and the data compressor. In a further alternative, the selected processor includes the data compressor and the memory access unit includes the data expander. In yet another alternative, the apparatus further comprises a tag table. The memory access unit desirably stores the compression information in the tag table. In this case, the compression information preferably includes a compression type, a compressed data size, and an address identifier that identifies where the data is stored in the shared memory. The tag table is preferably integrated with the memory access unit.

In another alternative, the memory access unit is configured to generate compressed data packets based on the compressed data, the compressed data packets each including a compression type and a compressed data size. In a further alternative, the data compressor comprises a plurality of data compressors, the data expander comprises a plurality of data expanders, and each of the processors includes one of the data compressors and one of the data expanders. In yet another alternative, the shared memory is an on-chip memory. In another alternative, the memory access unit is a direct memory access controller.

In accordance with another embodiment of the present invention, a processing system is provided. The processing system comprises a processor configured to process data, and a memory access unit. The memory access unit is configured to transfer the data between the processor and a shared memory, and to manage compression information associated with the data that is compressed. The memory access unit includes a data compressor and a data expander. The data compressor is configured to perform compression of the data and the data expander is configured to perform decompression of the data.

In one alternative, the processing system further comprises a tag table for storing the compression information. The tag table is connected to the memory access unit. In this case, the compression information preferably includes a compression type, a compressed data size, and an address identifier that identifies where the data is stored in the shared memory. In another alternative, the data is stored in the shared memory in a compressed state. In this case, the data is preferably stored in the compressed state such that the data is in alignment with an uncompressed data access grain.

In accordance with yet another embodiment of the present invention, a processing system is provided. The processing system comprises a processing element and a memory access unit. The processing element includes a bus, a processing unit, and a plurality of sub-processing units connected to the processing unit by the bus. A selected one of the sub-processing units is configured to transfer and store compressed data in a memory using the memory access unit. Compression information associated with the compressed data is stored by the processing system.

In one alternative, the selected sub-processing unit includes a data compressor for receiving uncompressed data and for generating the compressed data that is transferred to the memory, and a data expander for receiving the compressed data from the memory and for decompressing the received compressed data. In another alternative, the memory access unit includes a data compressor for receiving uncompressed data and for generating the compressed data that is transferred to the memory, and a data expander for receiving the compressed data from the memory and for decompressing the received compressed data. In this case, the memory access unit preferably comprises a direct memory access controller. Alternatively, the direct memory access controller is preferably integrated with the selected sub-processing unit.

In another alternative, the processing system further comprises a tag table for storing the compression information. In this case, the compression information preferably includes a compression type, a compressed data size, and an address identifier that identifies where the compressed data is stored in the shared memory. In yet another alternative, the selected sub-processing unit includes a data compressor for receiving uncompressed data and for generating the compressed data that is transferred to the memory, and the memory access unit includes a data expander for receiving the compressed data from the memory and for decompressing the received compressed data.

In a further alternative, the memory access unit comprises a direct memory access controller integrated with the selected sub-processing unit, and the processing system further includes a memory controller in operative communication with the processing element and the memory. In this case, the memory controller preferably includes a data compressor for receiving uncompressed data and for generating the compressed data that is transferred to the memory, and a data expander for receiving the compressed data from the memory and for decompressing the received compressed data. Here, the processing system desirably further comprises a tag table associated with the memory controller for storing the compression information.

In accordance with a further embodiment of the present invention, a computer processing system is provided. The computer processing system comprises a user input device, a display interface for attachment of a display device, a processor comprising one or more processing elements, a memory access unit coupling the processor to a memory, the memory access unit being configured to transfer and store compressed data in the memory, and to retrieve the compressed data from the memory, and a tag table for storing compression information associated with the compressed data. The processor preferably generates the compressed data from uncompressed data. The memory access unit desirably receives uncompressed data from the processor and generates the compressed data.

In accordance with another embodiment of the present invention, a plurality of computer processing systems is provided. The plurality of computer processing systems are connected to one another via a communications network. Each of the computers comprises a user input device, a display interface for attachment of a display device, a processor comprising one or more processing elements, a memory access unit coupling the processor to a memory, the memory access unit being configured to transfer and store compressed data in the memory, and to retrieve the compressed data from the memory, and a tag table for storing compression information associated with the compressed data.

In accordance with another embodiment of the present invention, a data processing method is provided. The method comprising compressing data to generate compressed data; identifying compression information associated with the compressed data; managing the compression information with a memory access unit; and transferring the compressed data from a selected one of a plurality of processors to a shared memory using the memory access unit, the shared memory being accessible to the plurality of processors.

In one alternative, the method further comprises generating at least one data packet that includes the compressed data, a compression type and a compressed data size. In this case, transferring the compressed data preferably includes transferring the at least one data packet to the shared memory. In another alternative, the method further comprises storing the compression information in a tag table. In this case, the compression information desirably includes a compression type, a compressed data size, and an address identifier that identifies where the compressed data is stored in the shared memory.

In a further alternative, a data compressor that is part of the memory access unit compresses the data. In yet another alternative, a data compressor that is part of the selected processor compresses the data. The compressed data may be stored in the shared memory in a compressed state. If the compressed data is stored in the compressed state, it is preferably stored such that the data is in alignment with an uncompressed data access grain.

In another alternative, the method preferably further comprises retrieving the compressed data from the shared memory; and decompressing the compressed data using the compression information. In one example, a data expander that is part of the memory access unit preferably decompresses the compressed data. In this case, a data compressor that is part of the memory access unit desirably compresses the data. In another example, a data expander that is part of the selected processor decompresses the compressed data. In this case, a data compressor that is part of the selected processor desirably compresses the data. In another case, a data compressor that is part of the selected processor compresses the data and a data expander that is part of the memory access unit decompresses the compressed data.

In accordance with yet another embodiment of the present invention, a storage medium storing a program for use in a processing system is provided. The processing system preferably includes a processor and a memory access unit. The program causes at least one of the processor and the memory access unit to compress data to generate compressed data; identify compression information associated with the compressed data; manage the compression information using the direct memory access controller; and transfer the compressed data from the processor to memory using the memory access unit. In one alternative, the program further causes at least one of the processor and the memory access unit to generate at least one data packet that includes the compressed data, a compression type and a compressed data size. In this case, transferring the compressed data includes transferring the at least one data packet to the memory. In another alternative, the program further causes at least one of the processor and the memory access unit to retrieve the compressed data from the memory; and decompress the compressed data using the compression information.

DETAILED DESCRIPTION

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. For instance, a DMAC may be used in accordance with preferred embodiments to transfer compressed data. It should be understood that the present invention may utilize any type of memory access unit, including a DMAC or other data transfer unit within a processor, a memory controller in a multi-processor system. etc.

Figure 1:
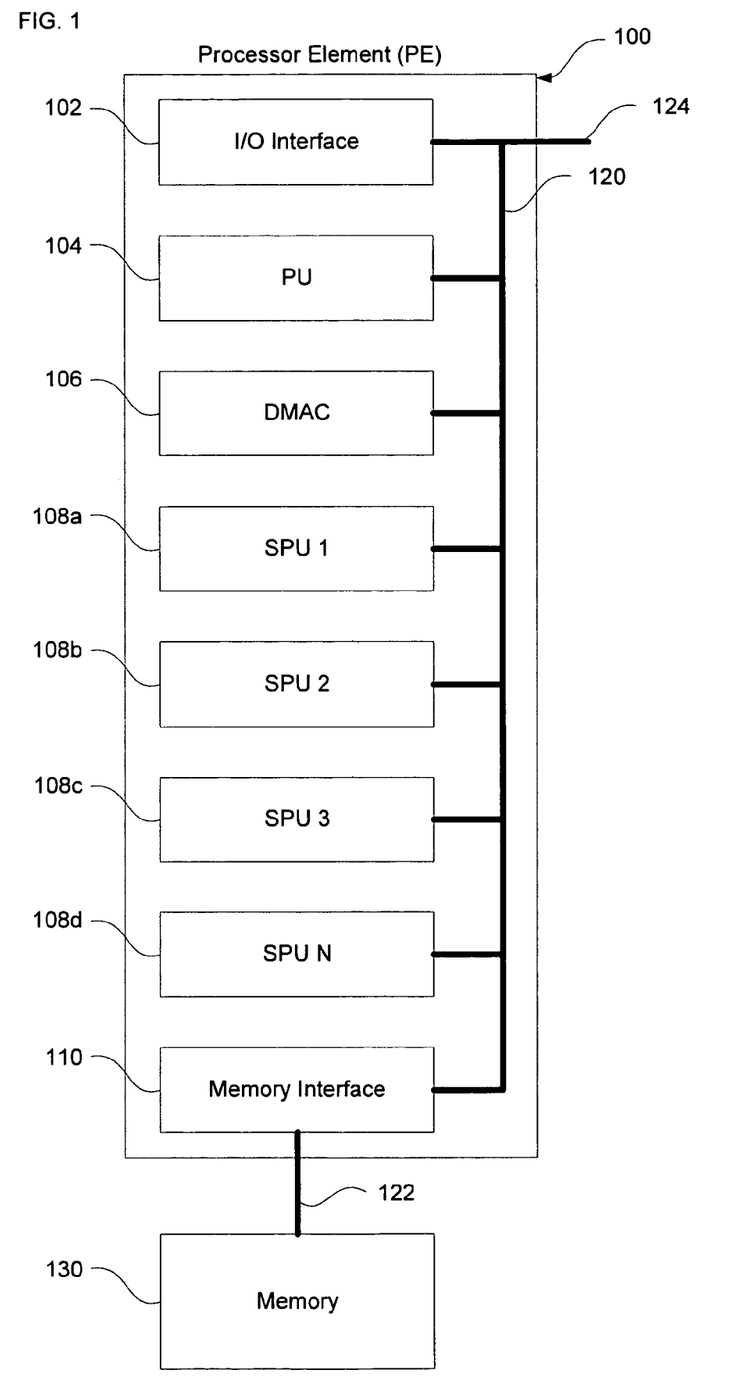
FIG. 1 is a diagram illustrating an exemplary structure of a processing element in accordance with aspects of the present invention.

Reference is now made to FIG. 1, which is a block diagram of a basic processing module or processor element (PE) 100. As shown in this figure, PE 100 comprises an I/O interface 102, a processing unit (PU) 104, a direct memory access controller (DMAC) 106, and a plurality of sub-processing units (SPUs) 108, namely SPUs 108a-108d. While four SPUs 108a-d are shown, the PE 100 may include any number of such devices. A local (or internal) PE bus 120 transmits data and applications among PU 104, the SPUs 108, I/O interface 102, DMAC 106 and a memory interface 110. Local PE bus 120 can have, e.g., a conventional architecture or can be implemented as a packet switch network. Implementation as a packet switch network, while requiring more hardware, increases available bandwidth. The I/O interface 102 may connect to one or more external I/O devices (not shown), such as frame buffers, disk drives, etc. via an I/O bus 124. Preferably, a number of PEs, such as PE 100, may be joined or packed together, or otherwise logically associated with one another, to provide enhanced processing power.

PE 100 can be constructed using various methods for implementing digital logic. Typically, the components of PE 100 are constructed as integrated circuits employing a complementary metal oxide semiconductor (CMOS) on a substrate. The substrate is preferably a silicon substrate. Alternative materials for the substrate include, but are not limited to, gallium arsenide, gallium aluminum arsenide and other so-called III-B compounds employing a wide variety of dopants. Components could also be implemented using superconducting material, e.g., rapid single-flux-quantum (RSFQ) logic.

PE 100 preferably is constructed, however, as a single integrated circuit employing CMOS on a silicon substrate. PE 100 is closely associated with a memory 130 through a high bandwidth memory connection 122, which preferably has a transfer rate of at least 128 Gbits/sec. More preferably, the transfer rate is on the order of 204.8 Gbits/sec. The memory 130 desirably functions as the main memory for PE 100. Although the memory 130 is preferably a DRAM, the memory 130 could be implemented using other means, e.g., as a static random access memory (SRAM), a magnetic random access memory (MRAM), an optical memory, a holographic memory, etc. DMAC 106 and memory interface 110 facilitate the transfer of data between the memory 130 and the SPUs 108 and PU 104 of the PE 100. The memory 130 may be provided on the same chip or a different chip than the one housing the PE 100. For instance, in certain implementations, the memory 130 may be embedded in or otherwise integrated as part of the processor chip ("on chip") containing one or more of the PEs 100, as opposed to being a separate, external memory ("off chip"). The memory 130 may be in a separate location on the chip or can be integrated in one or more of the PEs 100.

PU 104 can be, e.g., a standard processor capable of standalone processing of data and applications. In operation, the PU 104 schedules and orchestrates the processing of data and applications by the SPUs 108. The SPUs 108 preferably are single instruction, multiple data (SIMD) processors. Under the control of PU 104, the SPUs 108 may perform the processing of the data and applications in a parallel and independent manner. DMAC 106 controls accesses by PU 104 and the SPUs 108 to the data and applications stored in the shared memory 130. Preferably, the PE 100, including the PU 104, the SPUs 108 and the DMAC 106 comprise a monolithic device, such as a single integrated circuit chip or a single board processing system.

Figure 2:
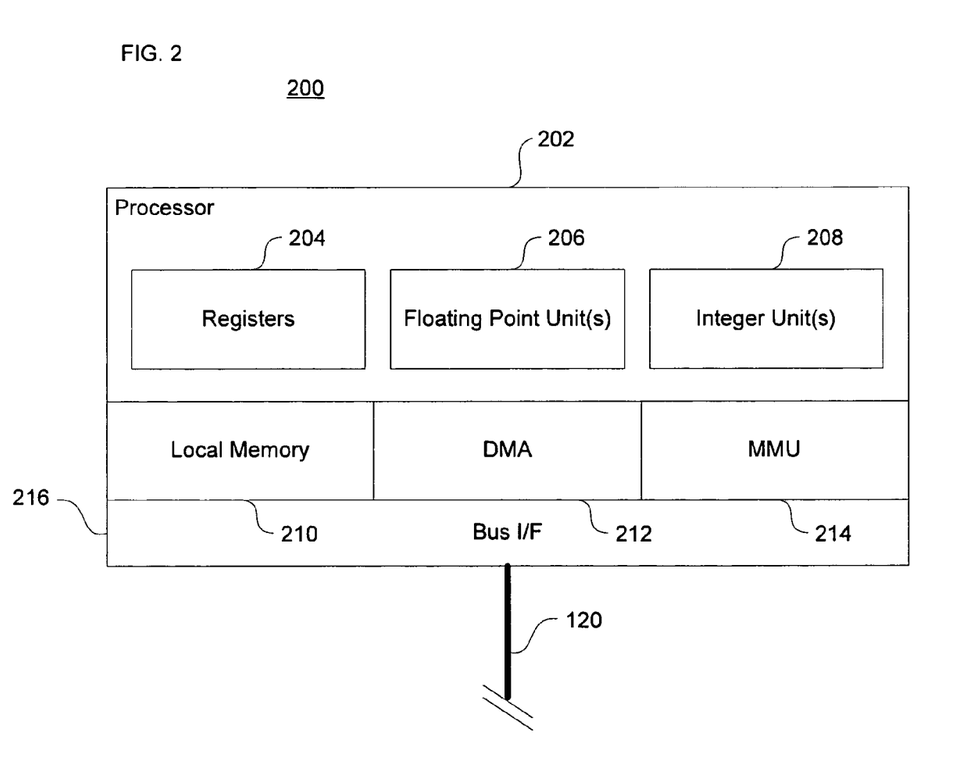
FIG. 2 is a diagram illustrating a sub-processing unit in accordance with aspects of the present invention.

FIG. 2 illustrates an SPU 200 in more detail. The SPU 200 includes a processor 202, which preferably is associated with registers 204, one or more floating point units 206 and one or more integer units 208. The SPU 200 also includes a local memory 210, DMA 212 and memory management unit (MMU) 214.

Depending upon the processing power required, a greater or lesser number of floating point units 206 and integer units 208 may be employed. In a preferred embodiment, the local memory 210 contains at least 128 kilobytes of storage, and the capacity of the registers 204 is 128×128 bits. The floating point units 206 preferably operate at a speed of at least 32 billion floating point operations per second (32 GFLOPS), and the integer units 208 preferably operate at a speed of at least 32 billion operations per second (32 GOPS). Desirably, the floating point units 206 and the integer units 208 are connected to the registers 204, which, in turn, are connected to the local memory 210.

The local memory 210 is preferably not a cache memory. Cache coherency support for the SPU 200 is unnecessary. Instead, the local memory 210 is preferably constructed as an SRAM. The PU 104 may require cache coherency support for direct memory access initiated by the PU 104. Cache coherency support is not required, however, for direct memory access initiated by the SPU 200 or for accesses to and from external devices.

The SPU 200 may further include a bus (not shown) for transmitting applications and data to and from the SPU 200 through a bus interface (bus I/F) 216. For example, the bus may be 1,024 bits wide. The SPU 200 may further include internal busses (not shown) for interconnecting various devices. For example, a bus providing communication between the local memory 210 and the registers 204 may have a width of 128 bits. Busses may also provide communications between, respectively, the registers 204 and the floating point units 206, and the registers 204 and the integer units 208. Desirably, the width of the busses from the registers 204 to the floating point or integer units is 384 bits, and the width of the busses from the floating point or integer units to the registers 204 is 128 bits. The larger width of the busses from the registers 204 to the floating point units 206 and the integer units 208 can be used to accommodate the larger data flow from the registers 204 during processing.

The DMA 212 and/or the MMU 214 may be implemented in hardware, software or a combination of both. Preferably, the DMA 212 includes or is programmed to utilize application software for communicating with the DMAC 106 and directing it to transfer data to and from the memory 130. The MMU 214 preferably manages operation of the local memory 210. Alternatively, the MMU 214 may administrate address translations of system global addresses including system memory, but may not manage operations of the local memory.

It should be understood that the above processing modules and architectures are merely exemplary, and the various aspects of the present invention may be employed with other structures, including, but not limited to multiprocessor systems of the types disclosed in U.S. Pat. No. 6,526,491, entitled "Memory Protection System and Method for Computer Architecture for Broadband Networks," issued on Feb. 25, 2003, and in copending U.S. application Ser. No. 09/816,004, entitled "Computer Architecture and Software Cells for Broadband Networks," filed on Mar. 22, 2001, both of which are hereby expressly incorporated by reference in their entireties.

As discussed above, one of the problems with multiprocessing systems has been a data transfer bottleneck between the processors and the shared memory. It has been discovered that such a bottleneck can be avoided by compressing data before transferring it to the memory 130. Compression reduces the amount of data being transferred and achieves efficient bandwidth usage. In several preferred embodiments, the compression is performed locally on-chip, for example, within the DMAC 106 or the SPU 200, as will be described below.

Figure 3:
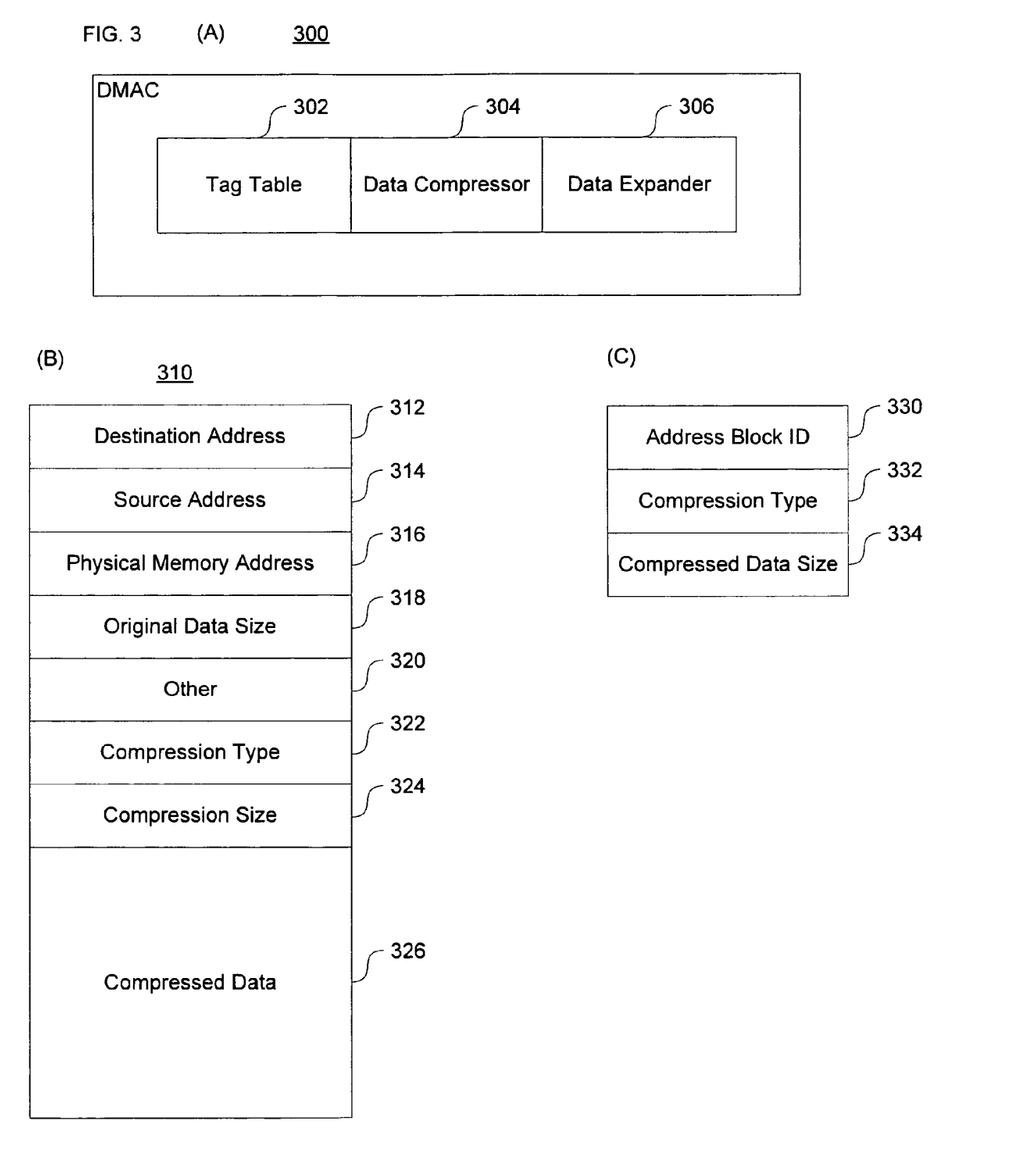
FIGS. 3A-C illustrate features of a direct memory access controller and compressed data packets in accordance with aspects of the present invention.

FIG. 3(A) illustrates a DMAC 300 that implements on-chip data compression in accordance with an aspect of the present invention in more detail. A tag table 302 is preferably associated with the DMAC 300. A data compressor 304 and a data expander 306 are also preferably associated with the DMAC 300. The tag table 302 is can be integrated within the DMAC 300, for example in a look up table in memory. The tag table 302 preferably includes a memory block address, a compression type and an indicator of the amount of data that is compressed. The components 302, 304 and 306 are used by the DMAC 300 during data transmission and reception, as will be explained later.

In alternative embodiments, the tag table 302 may be external to the DMAC 300, for instance, as a different component within the PE 100. The tag table 302 may be integrated in or otherwise associated with a memory access unit. The memory access unit may be external to a processor such as PE 100.

When the DMAC 300 issues a request to read data from another memory access unit, such as a memory controller, the memory controller looks up a compression type and the amount of compressed data from the tag table 302. Then, the memory controller transfers the compressed data, the compression type and the compression amount to an expander (decompressor). The expanded data is preferably transferred to the DMAC 300 along with the compression type and the compression amount. When the DMAC 300 issues a request to write data to the memory controller, the DMAC 300 sends data to a compressor along with a compression type. The compressor compresses the data and then transfers the data to the memory controller with the compression type and the compression amount. Preferably, this information is stored in the tag table 302.

An example explaining data transfer to a memory such as the memory 130 will now be described. Once a memory transfer such as a DMA transfer begins, the DMAC 300 may receive data packets from a processor, for example, the SPU 200, the PU 104 or the PE 100. A given data packet preferably includes uncompressed data, and may also include a destination address, a source address, a physical memory address, data size, as well as other information. Upon receipt of the data by the memory access unit, such as the DMAC 300, the data compressor 304 preferably compresses the uncompressed data (if necessary) and adds additional information to the data packet. The information may be parameters pertaining to compression. One such parameter is the compression type, and another parameter is the compressed data size, or compression size.

The compression type indicates the type of compression performed on the data. The compressed data size indicates the actual size of the data after compression. It should be appreciated that numerous types of compression schemes can be employed, including, but not limited to run length encoding (such as low density run length encoding), variable length encoding, and substitution compression (e.g., Lempel-Ziv compression). By way of example only, a selected type of run length encoding may be represented by a numerical value, such as 000010. The compression type may also indicate no compression, using, for example, the value 000000. It is to be understood that the number of bits used to represent the compression scheme may be greater or lesser than six bits, depending upon, e.g., the number of different compression schemes supported by the processing system.

FIG. 3(B) illustrates a data packet 310 formed in accordance with the compression. As with the original packet, the data packet 310 of compressed data may include a destination address 312, a source address 314 and a physical memory address 316. It also preferably includes the original data size 318 prior to compression, other information or reserved information 320, compression type 322, compression size 324 and compressed data 326.

Each data packet 310 or group of data packets 310 may be associated with an address block or address space in the memory 130. Once the DMAC 300 generates such data packets 310, it stores the compression type 332 and the compressed data size 334 in the tag table 302 along with an address block identifier 330, as seen by FIG. 3(C). Thus, the tag table 302 is able to keep track of the data stored in each address block, as well as the type and amount of compression.

Once compressed, the data packets 310 are preferably of a much smaller size than the original uncompressed packets. Thus, when the DMAC 300 transfers the data packets 310 to the memory 130, they take up a much smaller portion of the available bandwidth as compared to the uncompressed packets. This, in turn, eliminates the bottleneck problem.

Similarly, when data is transferred from the memory 130 to the PE 100, PU 104 or SPU 200, it is preferably maintained in the compressed format of the data packet 310. In this case, the compressed data packet 310 is received by the DMAC 300 and decompressed or expanded, if necessary, by the data expander 306. The data expander 306 preferably operates in conjunction with the tag table 302, using the compression type 332, the compressed data size 334 and the address block identifier 330 to aid in decompressing the data.

Figure 4:
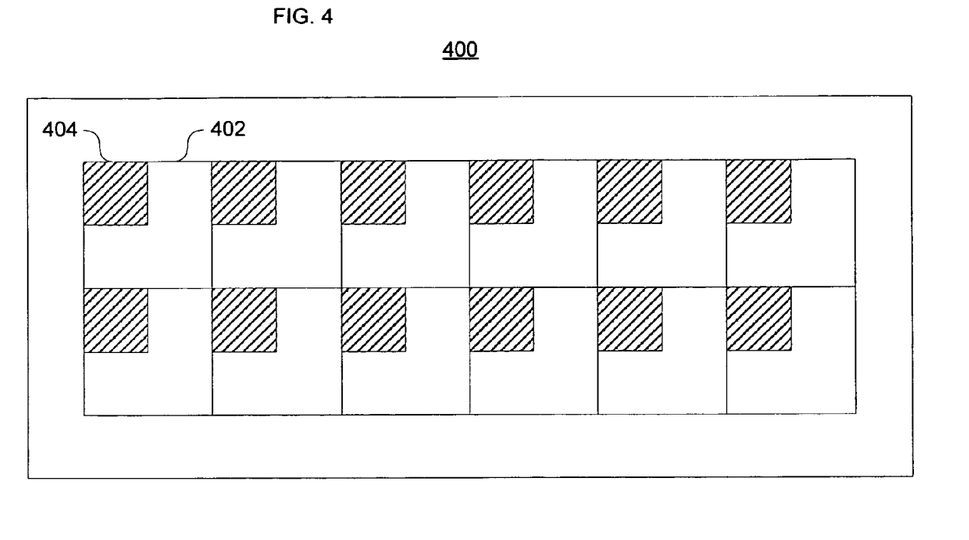
FIG. 4 illustrates a memory for storing data in accordance with aspects of the present invention.

FIG. 4 illustrates a memory array 400, which may be, e.g., a portion of the memory 130. The memory array 400 stores the compressed data packets 310. Preferably, each data packet 310 or a group of data packets 310 is stored in a memory block 402. The data packets 310 are preferably stored in a compressed state as blocks 404 within the memory blocks 402. It is possible to decompress the data packets 310 upon receipt by the memory array 400 and store them in an uncompressed state, filling or substantially filling one or more of the memory blocks 402. However, such compression (and decompression prior to transmission back to the processor) may incur unnecessary costs and require additional resources, such as a compressor/decompressor associated with the memory array 400. Thus, it is desirable to store the compressed data packets 310 in the form of the blocks 404. In this case, because the blocks 404 are spaced across the memory blocks 402, the data packets 310 will take up as many blocks 402 in the memory array 400 as the original uncompressed data would. Preferably, the blocks 404 are stored in alignment with the original (uncompressed) data access grain of uncompressed data. As used herein, the term "data access grain" means a preferable data transfer size. By way of example only, a cache line size is a preferable data transfer size for the cache, and any data access from the processor is preferably normalized to the cache line size on the bus. In accordance with an aspect of the present invention, the data access grain is preferably a page size, for instance 4 Kbytes, 64 Kbytes, etc. The amount of expanded (uncompressed) data is desirably equivalent to a page size. This simplifies the processing required by the DMAC 300 to service read and write requests from the PE 100, PU 104 and/or SPU 200. For instance, there is no need to re-compute address pointers for the compressed data.

As explained by the above discussion, the DMAC 300 may perform the data compression and decompression operations. Alternatively, it is possible for one or more of the processors, e.g., PE 100, PU 104 and/or SPU(s) 108 to perform compression, decompression or both. When the PE 100, the PU 104 and/or the SPU(s) 108 perform these functions, they can use the structure and components previously described with respect to the DMAC 300.

Figure 5:
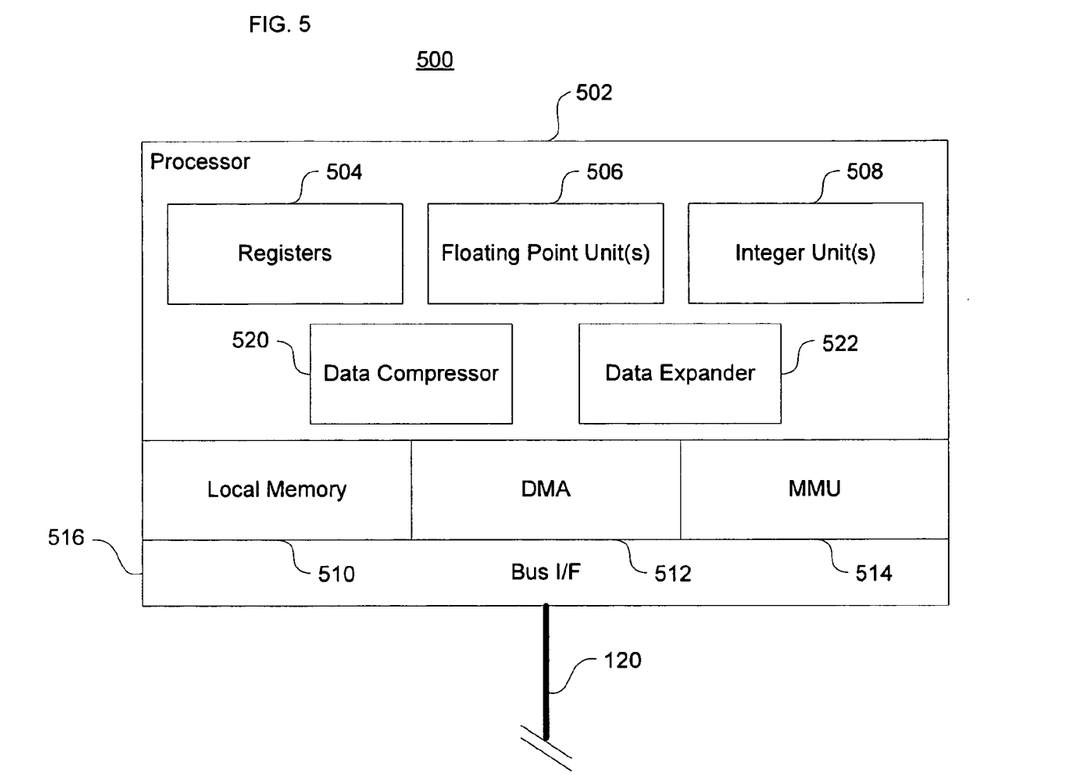
FIG. 5 is a diagram illustrating a sub-processing unit in accordance with aspects of the present invention.

FIG. 5 illustrates an SPU 500 that is generally similar to the SPU 200, but also includes compression and decompression capability. The SPU 500 includes a processor 502, which preferably is associated with registers 504, one or more floating point units 506 and one or more integer units 508. The SPU 500 also includes a local memory 510, DMA 512, MMU 514 and bus I/F 516. These components operate in the same manner as described above with respect to the components of SPU 200.

The processor 502 preferably additionally includes both a data compressor 520 and a data expander 522, which may be separate components or which may be integrated into a single data compressor/expander. The data compressor 520 and the data expander 522 perform functions equivalent to the data compressor 304 and the data expander 306, respectively, of the DMAC 300. Because compression and decompression can be performed in the processor itself using the data compressor 520 and the data expander 522, it is not necessary for the DMAC 300 to include either the data compressor 304 or the data expander 306.

By way of example, in a data transfer to the memory array 400, the DMA 512 and/or the MMU 514 may prepare data packets based upon data stored in the local memory 510. The data compressor 520 preferably compresses the uncompressed data and adds additional information to the data packet, e.g., the compression type and the compressed data size. Data packets are formed in the manner discussed above for data packet 310. Once the DMA 520 generates the data packets 310, it stores the compression type 332 and the compressed data size 334 in the tag table 302 along with an address block identifier 330. Thus, the tag table 302 is able to keep track of the data stored in each address block, as well as the type and amount of compression. Once the data packets 310 are generated and the tag table 302 is created, the DMA 512 communicates with the DMAC 300 to transmit the data to the memory array 400, where the data is stored in the blocks 404.

When data is retrieved from the memory array 400, the DMAC 300 passes it to the DMA 512. The data expander 522 decompresses or expands the data (assuming the data is compressed). The data expander 522 preferably operates in conjunction with the tag table 302 associated with the DMAC 300, using the compression type 332, the compressed data size 334 and the address block identifier 330 to aid in decompressing the data. Once decompressed, the data may be stored in the local memory 510, processed by the processor 502 and/or transferred to another device.

It is also possible to perform compression in the processor, e.g., SPU 500, PU 104 or the PE 100, and perform decompression at the DMAC 300. In this case, for example, the SPU 500 would include the data compressor 520 but would not need to include the data expander 522. Similarly, the DMAC 300 would include the data expander 306 but would not need to include the data compressor 304.

In a data transfer to the memory array 400 in this situation, the DMA 512 and/or the MMU 514 may prepare data packets based upon data stored in the local memory 510. The data compressor 520 preferably compresses the uncompressed data and adds additional information to the data packet, e.g., the compression type and the compressed data size. Data packets are formed in the manner discussed above for data packet 310. Once the data packets are generated, the compression type 332 and the compressed data size 334 are stored in the tag table 302 along with an address block identifier 330. Thus, the tag table 302 is able to keep track of the data stored in each address block, as well as the type and amount of compression. Then the data packets 310 are sent to the memory array 400 via the DMAC 300.

Similarly, when data is transferred from the memory array 400 to the SPU 500, the compressed data packet 310 is received by the DMAC 300 and decompressed or expanded by the data expander 306. The data expander 306 preferably operates in conjunction with the tag table 302, using the compression type 332, the compressed data size 334 and the address block identifier 330 to aid in decompressing the data. After decompression, the DMAC 300 transfers the decompressed data packet to the SPU 500 for subsequent processing and/or storage.

Optionally, data sent internally along the PE bus 120 between, e.g., a pair of the SPUs 108 may be compressed. In this case, each SPU 108 preferably includes the data compressor 520 and the data expander 522. Compression in this manner may be implemented depending on the bandwidth of the PE bus 120. However, it may be unnecessary if the PE bus 120 is sufficiently large, e.g., on the order of 128 Gbits/sec.

Figure 6:
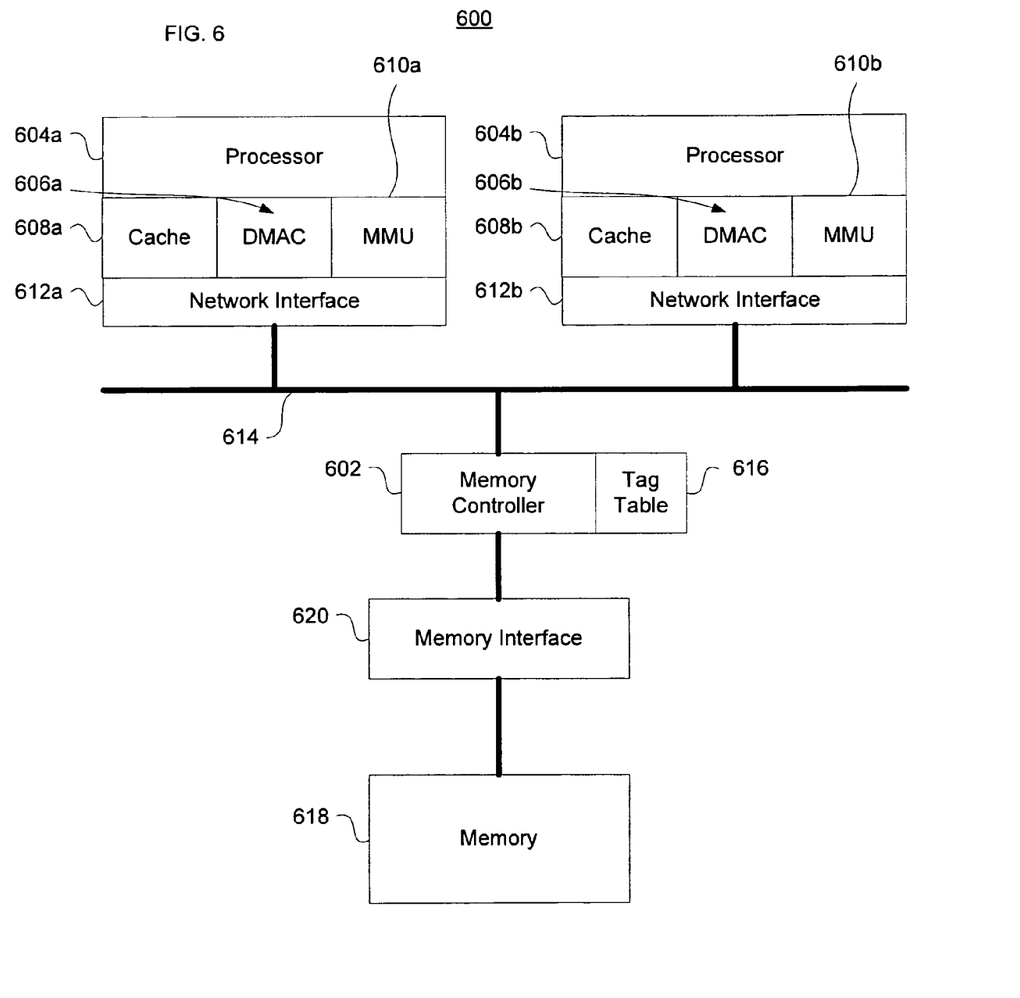
FIG. 6 is a diagram illustrating a multi-processor system in accordance with aspects of the present invention.

FIG. 6 illustrates a multi-processor system 600 wherein a memory controller 602 is separate from processors 604*a,b* and from DMACs 606*a,b*. The processors 604*a,b* may be, by way of example only, PEs, SPUs, or processors in separate computers or workstations. As shown in the figure, the processor 604*a* is connected to the DMAC 606*a*, cache 608*a*, and MMU 610*a*, as well as a network interface 612*a*. The processor 604b is connected to the DMAC 606b, cache 608b and MMU 610b, as well as a network interface 612b. It should be understood that the DMACs 606a,b, the caches 608a,b, the MMUs 610a,b and/or the network interfaces 612a,b may be integrated with or separate from the respective processors 604a,b. The network interfaces 612a,b are connected to the memory controller 602 via a network bus 614.

A tag table 616 is connected to or otherwise associated with the memory controller 602. The tag table 616 performs the same functionality as the tag table 302 discussed above. The tag table 616 preferably includes a memory block address, a compression type and an indicator of the amount of data that is compressed. Data is transmitted to or received from a memory 618 via a memory interface 620.

The data compressor and/or data expander may be incorporated in the memory controller 602, the processors 604a,b, or the DMACs 606a,b. In one alternative, the compressor and the expander are both integrated in the memory controller 602. In another alternative, compressors are located with the DMACs 606a,b and the expander is integrated in the memory controller 602. In yet another alternative, the compressor(s) and expander(s) are located with the processors 604a,b. Other compressor and expander combinations are permissible.

Figure 7:
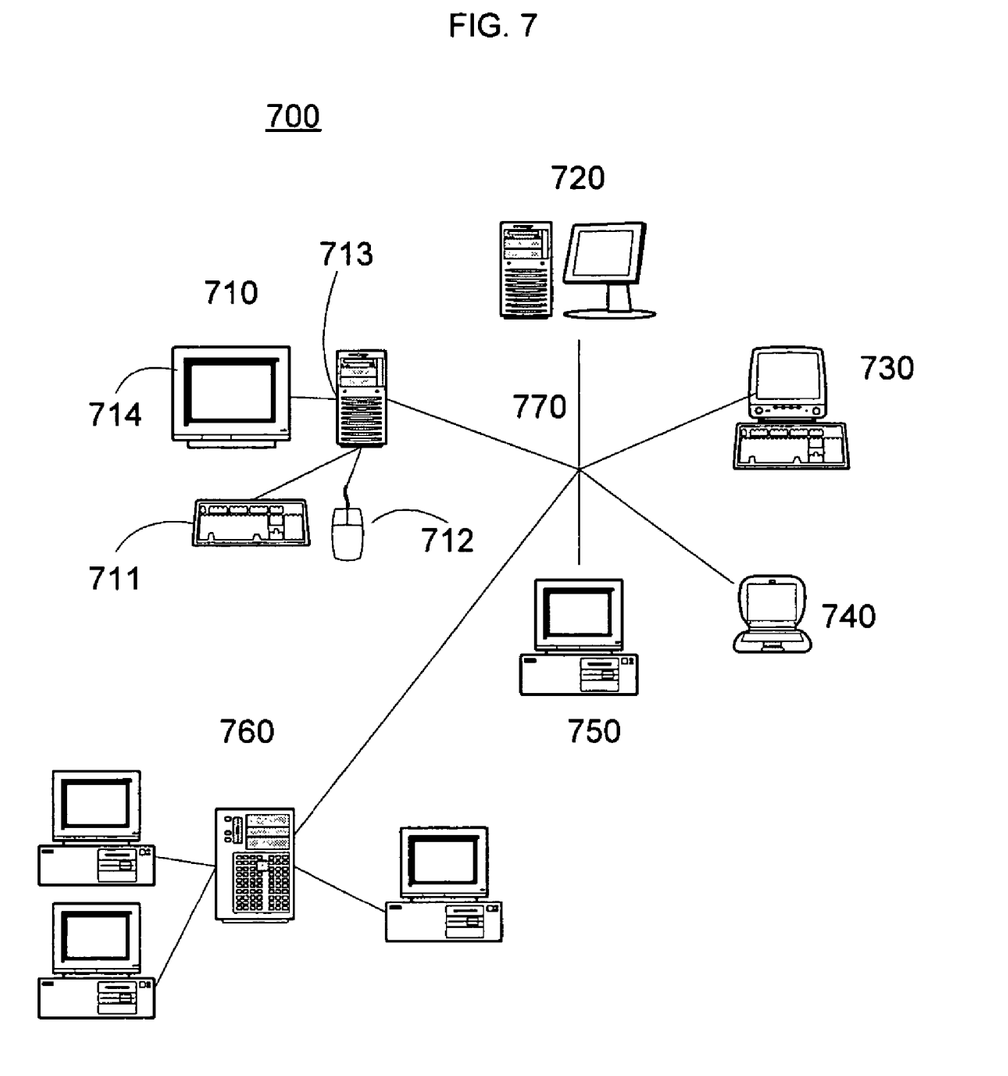
FIG. 7 illustrates a computing network in accordance with aspects of the present invention.

FIG. 7 is a schematic diagram of a computer network depicting various computing devices that can be used alone or in a networked configuration in accordance with the present invention. The computing devices may comprise computer-type devices employing various types of user inputs, displays, memories and processors such as found in typical PCs, laptops, servers, gaming consoles, PDAs, etc. For example, FIG. 7 illustrates a computer network 700 that has a plurality of computer processing systems 710, 720, 730, 740, 750 and 760, connected via a communications network 770 such as a LAN, WAN, the Internet, etc. and which can be wired, wireless, a combination, etc.

Each computer processing system can include, for example, one or more computing devices having user inputs such as a keyboard 711 and mouse 712 (and various other types of known input devices such as pen-inputs, joysticks, buttons, touch screens, etc.), a display interface 713 (such as connector, port, card, etc.) for connection to a display 714, which could include, for instance, a CRT, LCD, or plasma screen monitor, TV, projector, etc. Each computer also preferably includes the normal processing components found in such devices such as one or more memories, one or more memory access units, and one or more processors located within the computer processing system. The memory access units and processors within such computing device are adapted to perform compression prior to storing data in the memories, as well as decompression of the data upon retrieval from the memories, in accordance with the various aspects of the present invention as described herein. The memories can include memories for storing compressed data in accordance with the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A processing system, comprising:
a processor configured to process data; and
a memory access unit configured to transfer the data between the processor and a shared memory, and to manage compression information associated with the data that is compressed, the memory access unit including a data compressor and a data expander, the data compressor being configured to perform compression of the data and the data expander being configured to perform decompression of the data, the data being stored in the shared memory in a compressed state in alignment with an uncompressed data access grain.

2. The processing system of claim 1, further comprising a tag table for storing the compression information, the tag table being connected to the memory access unit.

3. The processing system of claim 2, wherein the compression information includes a compression type, a compressed data size, and an address identifier that identifies where the data is stored in the shared memory.

4. A processing system, comprising:
a processing element including a bus, a processing unit, and a plurality of sub-processing units connected to the processing unit by the bus, and a tag table;
a memory access unit; and
wherein a selected one of the sub-processing units is configured to transfer and store compressed data in a memory using the memory access unit, and the tag table stores compression information associated with the compressed data; and
wherein the data is stored in the compressed state in alignment with an uncompressed data access grain.

5. The processing system of claim 4, wherein the selected sub-processing unit includes a data compressor for receiving uncompressed data and for generating the compressed data that is transferred to the memory, and the memory access unit includes a data expander for receiving the compressed data from the memory and for decompressing the received compressed data.

6. The processing system of claim 4, wherein the memory access unit comprises a direct memory access controller integrated with the selected sub-processing unit, and the processing system further includes a memory controller in operative communication with the processing element and the memory.

7. The processing system of claim 6, wherein the memory controller includes a data compressor for receiving uncompressed data and for generating the compressed data that is transferred to the memory, and a data expander for receiving the compressed data from the memory and for decompressing the received compressed data.

* * * * *